United States Patent
Miansian et al.

(10) Patent No.: US 8,632,135 B2
(45) Date of Patent: *Jan. 21, 2014

(54) WHEEL WITH INTERNAL SPINNER AND LOCKING MECHANISM

(76) Inventors: James K. Miansian, Lake Forest, CA (US); Patrick Vogel, Signal Hill, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/022,557

(22) Filed: Feb. 7, 2011

(65) Prior Publication Data

US 2011/0156473 A1    Jun. 30, 2011

Related U.S. Application Data

(63) Continuation-in-part of application No. 12/236,460, filed on Sep. 23, 2008, now Pat. No. 7,882,877, which is a continuation-in-part of application No. 11/274,891, filed on Nov. 15, 2005, now Pat. No. 7,427,110, which is a continuation-in-part of application No. 10/942,511, filed on Sep. 16, 2004, now Pat. No. 6,964,454.

(51) Int. Cl.
    *B60B 7/20*    (2006.01)
(52) U.S. Cl.
    USPC ........................................... 301/37.25

(58) Field of Classification Search
    USPC ................. 301/37.101, 37.102, 37.25, 37.41; 40/587
    See application file for complete search history.

(56) References Cited

U.S. PATENT DOCUMENTS

| | | | |
|---|---|---|---|
| 3,005,906 A | 10/1961 | Butler, Jr. |
| 3,722,958 A | 3/1973 | Marshall |
| 5,222,785 A | 6/1993 | Green |
| 5,290,094 A | 3/1994 | Gragg |
| 6,030,049 A | 2/2000 | Russell |
| 6,264,284 B1 | 7/2001 | Lees |
| 6,554,370 B2 | 4/2003 | Fowlkes |
| 6,637,830 B1 | 10/2003 | Burgess |
| 6,663,187 B2 | 12/2003 | Fitzgerald |
| 6,899,400 B1 | 5/2005 | Cook |
| 6,942,303 B2 | 9/2005 | Smith et al. |
| 6,964,454 B1 | 11/2005 | Miansian |
| 7,086,706 B1 | 8/2006 | Wood |
| 7,175,240 B2 | 2/2007 | Fultz et al. |
| 7,213,888 B2 | 5/2007 | Simpson |
| 2006/0055230 A1 | 3/2006 | Raddin et al. |
| 2006/0087171 A1 | 4/2006 | Riley et al. |

*Primary Examiner* — Kip T Kotter
(74) *Attorney, Agent, or Firm* — Eric Karich

(57) ABSTRACT

A wheel has a hub, a rim, first and second supports supporting the rim around the hub, and a spinner rotatably mounted around the hub between the first and second supports. A spinner locking mechanism may be used to selectively lock the spinner to prevent rotation of the spinner with respect to the first and second supports, or unlock the spinner to allow rotation of the spinner relative to the first and second supports.

1 Claim, 11 Drawing Sheets

WHEEL WITH INTERNAL SPINNER AND LOCKING MECHANISM

CROSS-REFERENCE TO RELATED APPLICATIONS

This application for a utility patent is a continuation-in-part of previously filed utility patent application Ser. No. 12/236,460, filed Sep. 23, 2008, now U.S. Pat. No. 7,882,877, which was a continuation-in-part of previously filed utility patent application Ser. No. 11/274,891, filed Nov. 15, 2005, now U.S. Pat. No. 7,427,110, which was a continuation-in-part of previously filed utility patent application Ser. No. 10/942,511, filed Sep. 16, 2004, now U.S. Pat. No. 6,964,454.

STATEMENT REGARDING FEDERALLY SPONSORED RESEARCH

Not Applicable

BACKGROUND OF THE INVENTION

1. Field of the Invention

This invention relates generally to wheels, and more particularly to a wheel with an internal spinner that includes a locking mechanism for locking the spinner with respect to the wheel.

2. Description of Related Art

Smith et al., U.S. Pat. No. 6,942,303, teaches a wheel and spinner assembly invented by Bernard Smith and Kirk A. Hoeppner. The wheel (i.e., bicycle wheel) includes a spinner mounted therein that spins relative to the wheel, for decorative effect.

Other examples of spinners include Fitzgerald, U.S. Pat. No. 6,663,187, which teaches a free-wheeling spinner mountable on a wheel by means of an adapter for accommodating wheels with similar bolt patterns and varying diameters. The spinner is mounted to the adapter by means of a bearing of inner and outer races secured respectively to the adapter and the spinner. Elongated lug nuts having a threaded free end receive bolts for securing the adapter to the automobile wheel.

Fowlkes, U.S. Pat. No. 6,554,370, teaches a wheel spinner that is mountable onto a corresponding wheel of a vehicle. The assembly includes a wheel mount supportable by the wheel. A spinner mount is connected to the wheel mount. A bearing assembly is supported by the spinner mount. A spinner is supported by the bearing assembly, wherein the bearing assembly allows the spinner to rotate independently relative to the corresponding wheel as the vehicle is in motion.

Simpson, U.S. Pat. No. 7,213,888, teaches a wheel spinner assembly adapted for use on an automobile that includes two spinners adjacent the wheel. The two spinners rotate with respect to each other, for decorative effect, and may also be locked with respect to each other for further control over the decorative effect.

Other patents of interest include Marshall, U.S. Pat. No. 3,722,958, Gragg, U.S. Pat. No. 5,290,094, Butler, Jr., U.S. Pat. No. 3,005,906, Green, U.S. Pat. No. 5,222,785, Lees, U.S. Pat. No. 6,264,284, and Russell, U.S. Pat. No. 6,030,049.

SUMMARY OF THE INVENTION

The present invention teaches certain benefits in construction and use which give rise to the objectives described below.

The present invention provides a wheel comprising a hub, a rim, first and second supports supporting the rim around the hub, and a spinner rotatably mounted around the hub between the first and second supports. The wheel further includes a spinner locking mechanism for selectively locking the spinner to prevent rotation of the spinner with respect to the first and second supports, or unlocking the spinner to allow rotation of the spinner relative to the first and second supports.

A primary objective of the present invention is to provide a wheel having advantages not taught by the prior art.

Another objective is to provide a wheel that includes a spinner that may be locked or unlocked relative to first and second supports of the wheel.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
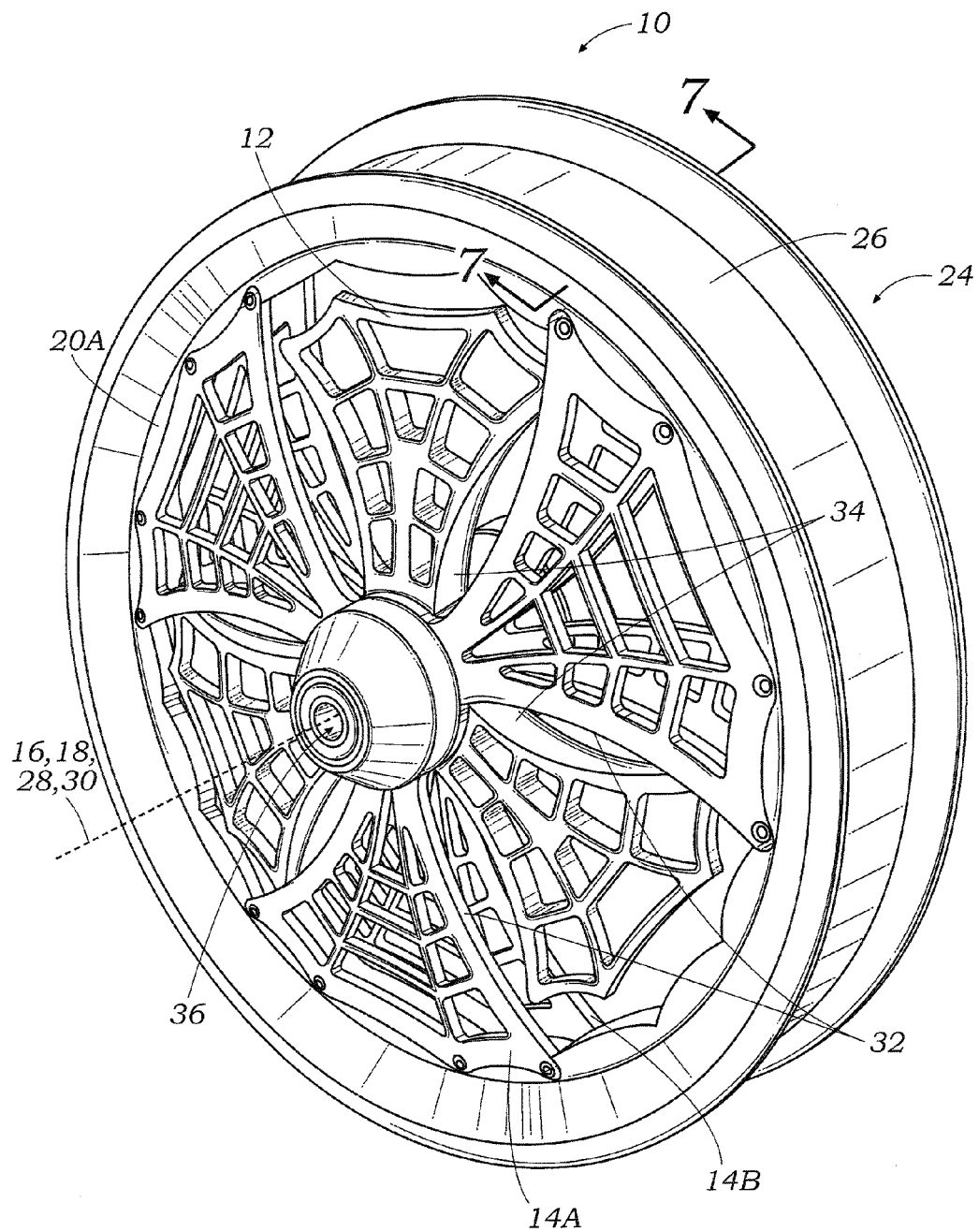
FIG. 1 is a perspective view of one embodiment of a wheel having a spinner rotatably mounted between a pair of supports.
Figure 7:
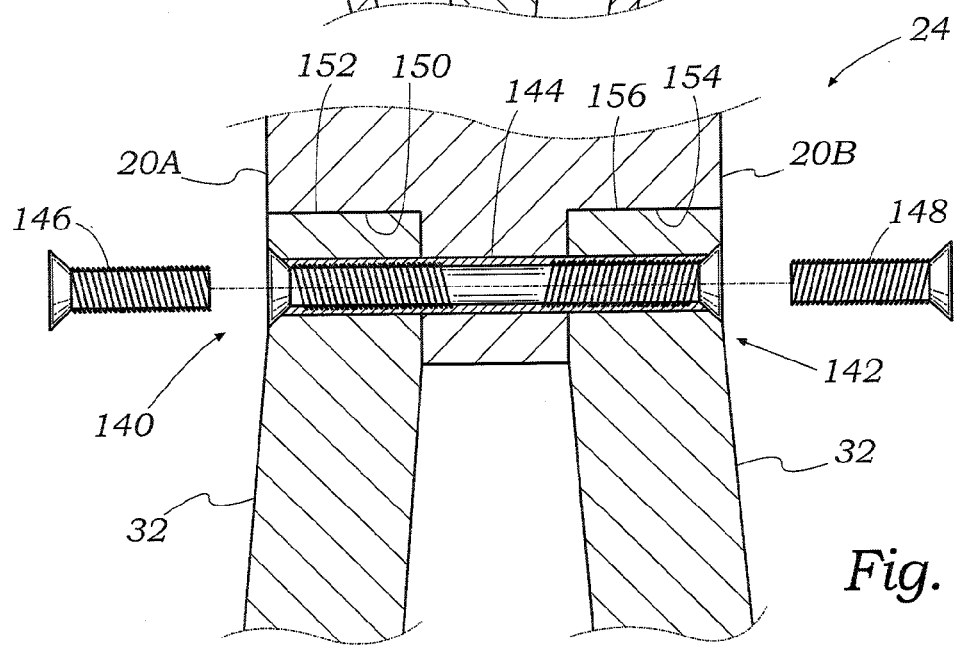
FIG. 7 is a sectional view of a portion of the wheel of FIG. 1 as indicated by lines 7-7 in FIG. 1, illustrating a mechanism used to connect spokes of supports to respective side surfaces of a rim, wherein the mechanism includes an internally threaded tube and a pair of bolts.

FIG. 1 is a perspective view of one embodiment of a wheel 10 having a spinner 12 rotatably mounted between a pair of supports 14A and 14B. The first support 14A has a first axis 16, and the second support 14B has a second axis 18. The first support 14A is connected to a side surface 20A of a rim 24. An opposed side surface 20B, shown in FIG. 7, is connected to the second support 14B. The rim 24 has an outer surface 26 adapted to receive a tire (not shown). The rim 24 has a third axis 28, and the spinner 12 has a fourth axis 30. As indicated in FIG. 1, the spinner 12 is rotatably mounted between the first and second supports 14A and 14B such that the axes 16 and 18 of the respective supports 14A and 14B, the axis 28 of the rim 24, and the axis 30 of the spinner 12 are all aligned.

The first support 14A is visible in FIG. 1, and in the embodiment of FIG. 1 the second support 14B is substantially identical. In general, the first support 14A has a central hub portion and a spanning portion extending from the hub portion, wherein the spanning portion is adapted for connection to the side surface 20A of the rim 24. In the embodiment of FIG. 1 the spanning portion of the first support 14A includes multiple spokes 32, wherein each of the spokes 32 is adapted for connection to the side surface 20A of the rim 24.

While this structure illustrates one embodiment of the wheel 10, those skilled in the art will recognize that the first and second supports 14A and 14B could have a wide variety of structures and still remain within the scope of the present invention, as claimed. The first and second supports 14A and 14B are not required to be identical, and they are not required to have any particular structure, except as required for the structural stability of the wheel 10. A wide variety of shapes, designs, or other features could be incorporated without deviating from the invention as claimed.

In general, the spinner includes a central hub portion and a decorative portion extending from the hub portion. In the embodiment of FIG. 1, the decorative portion may include multiple arms 34, wherein each of the arms 34 resembles one of the spokes 32. However, as with the first and second supports 14A and 14B described above, the decorative portion could include any number of shapes, designs, or other features that enhance the ornamental design of the wheel 10.

In general, the spinner 12 rotates about the axis 30 independent of other components of the wheel 10. When a vehicle including the wheel 10 is moving and the rim 24 and the connected supports 14A and 14B are rotating, the spinner 12 may be rotating very slowly or not at all; further, when the vehicle comes to a stop and the rim 24 and the connected supports 14A and 14B are not rotating, the spinner 12 may continue to rotate. The contrast between the rates of rotation of the spinner 12 and the rim 24 and the connected supports 14A and 14B, provides a unique visual effect.

In the embodiment of FIG. 1, the wheel 10 has a hole 36 extending through a central portion of the wheel 10 and dimensioned to receive an axle rod (not shown) of a vehicle. As a result, the wheel 10 of FIG. 1 is particularly suited for use on vehicles wherein wheels are attached via axle rods (e.g., motorcycles). As indicated in FIG. 1, the aligned axes 16 and 18 of the respective supports 14A and 14B, 28 of the rim 24, and 30 of the spinner 12 pass through the hole 36. While one particular embodiment of the wheel 10 is shown, those skilled in the art will recognize that the wheel 10 can be adapted to almost any wheeled vehicle, including but not limited to cars, scooters, golf carts, skateboards, or indeed any form of wheeled vehicle.

Figure 2:
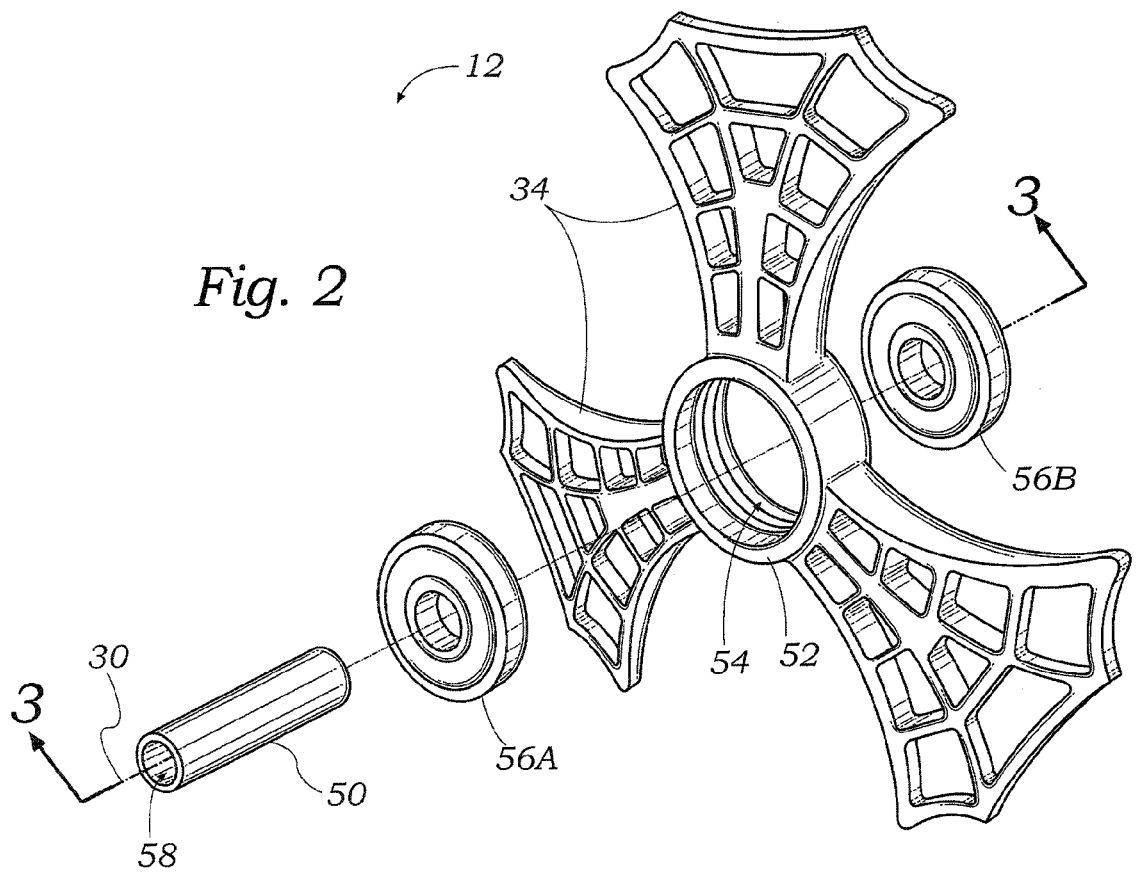
FIG. 2 is an exploded view of one embodiment of the spinner of FIG. 1 and an associated tube of the wheel of FIG. 1.

FIG. 2 is an exploded view of one embodiment of the spinner 12 of FIG. 1 and an associated tube 50 of the wheel 10 of FIG. 1. A central hub portion 52 of the spinner 12 has a central aperture 54 that is adapted to receive a pair of ball bearings 56A and 56B. A decorative portion, in this embodiment the multiple arms 34, extends radially outward from the hub portion 52. The tube 50 has a central opening 58 dimensioned to receive the axle rod. The tube 50 has a predetermined length and functions as a spacer, and also keeps various components of the wheel 10 of FIG. 1 in alignment. Each of the ball bearings 56A and 56B has a central opening, and in assembly the tube 50 passes through the central openings in each of the ball bearings 56A and 56B. (See FIG. 3.)

Figure 3:
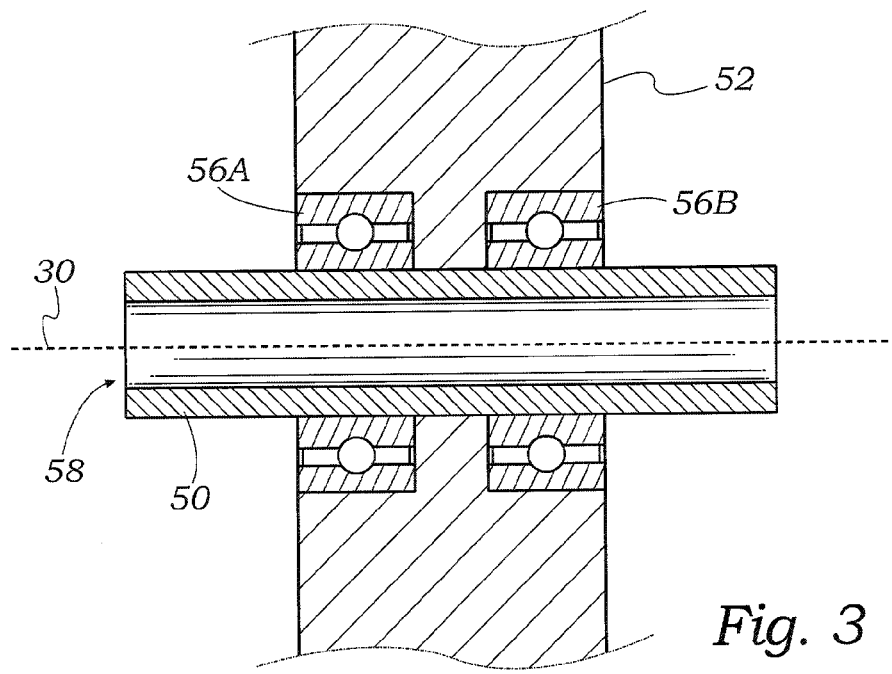
FIG. 3 is a sectional view of the spinner and the associated tube of FIG. 2 in assembly and as indicated by lines 3-3 in FIG. 2.

It is noted that although bearings 56A and 56B are ball bearings in the embodiment of FIG. 2, other types of bearings may also be used. Further, although the embodiment of FIG. 2 includes a pair of ball bearings 56A and 56B, other embodiments of the spinner 12 may have a single bearing, or more than 2 bearings, mounted in the central aperture 54. FIG. 3 is a sectional view of the spinner 12 and the associated tube 50 of FIG. 2 in assembly and as indicated in FIG. 2.

Figure 4:
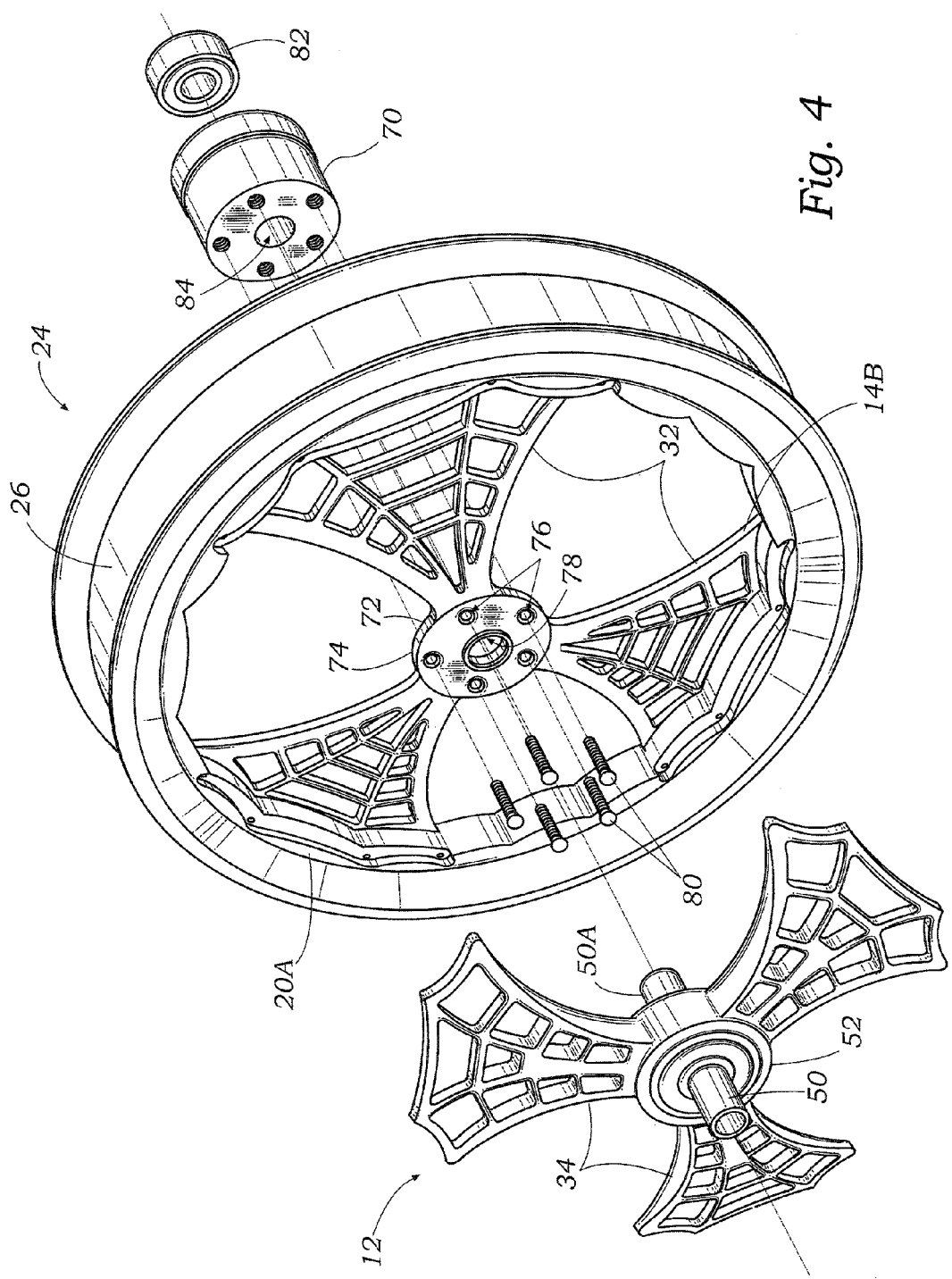
FIG. 4 is an exploded view of a portion of the wheel of FIG. 1 depicting a step of an assembly method wherein the spinner is rotatably mounted to one of the supports via the tube.
Figure 5:
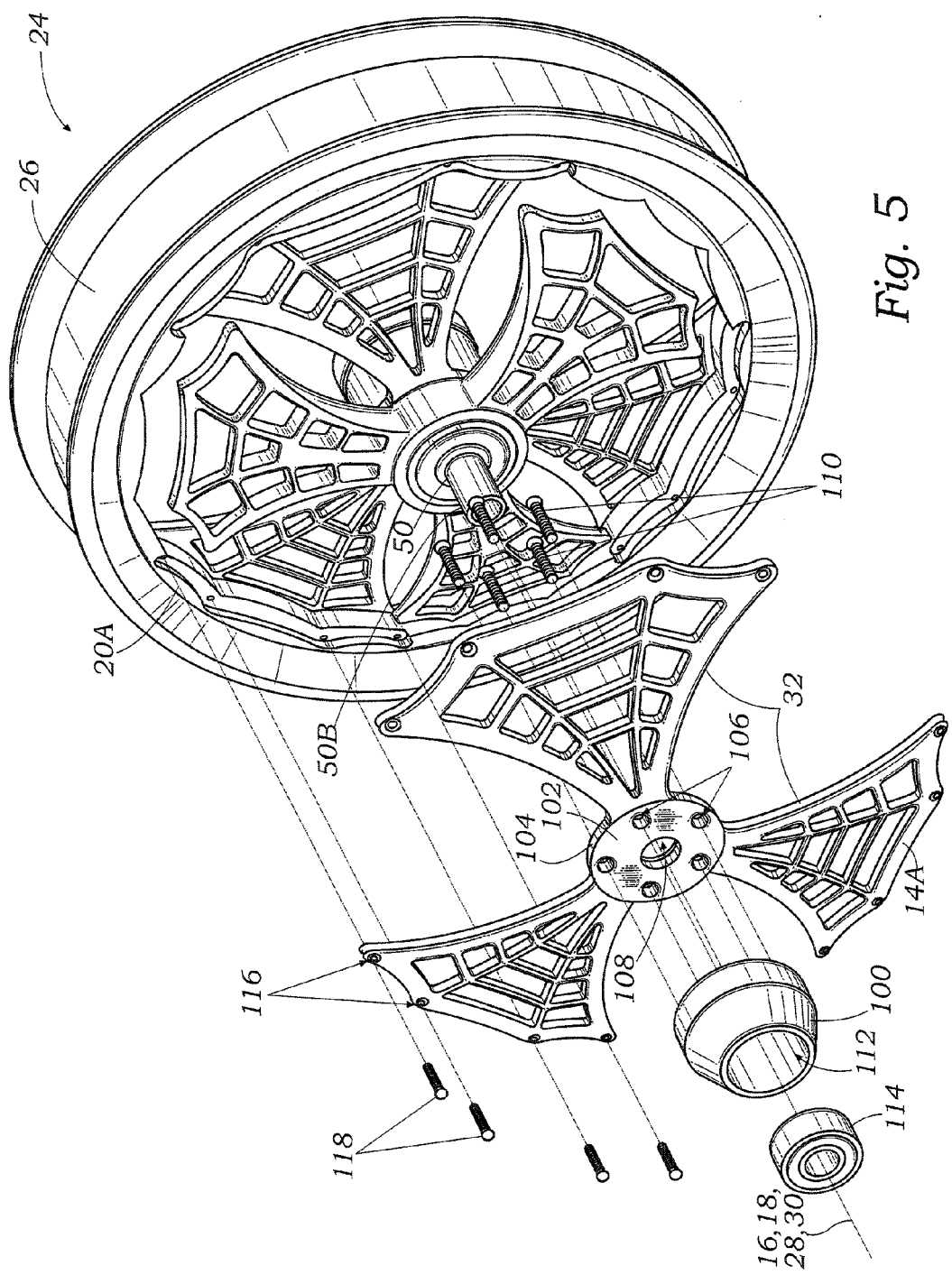
FIG. 5 is an exploded view of a portion of the wheel of FIG. 1 depicting another step of the assembly method wherein the other support is connected a side surface of a rim such that the spinner is rotatably mounted between the supports.

FIGS. 4 and 5 will now be used to illustrate one embodiment of a method for assembling the wheel 10 of FIG. 1. In FIG. 4, the second support 14B has already been connected (e.g., bolted) to the corresponding side surface of the rim 24. A hub extension 70 is connected to an outer surface 72 of a central hub portion 74 of the second support 14B. As described above, the second support 14B includes multiple spokes 32 extending from the central hub portion 74. In the embodiment of FIG. 4, the central hub portion 74 has five holes 76 surrounding a central aperture 78. Five bolts 80 are used to connect a side of the hub extension 70 to the outer surface 72 of a central hub portion 74 of the second support 14B. While bolts 80 are illustrated in the present embodiment, additional connectors such as dowels (not shown) may also be added to increase the strength of the connection, as is well known in the art.

Connected to the central hub portion 74 of the second support 14B, the hub extension 70 forms a part of the second support 14B. The hub extension 70 has a hole 84 passing therethrough. The tube 50 has two opposed ends, and mouth of the hole 84 in the side of the hub extension 70 connected to the central hub portion 74 of the second support 14B is dimensioned to receive an end 50A of the tube 50. It is noted that the hub extension 70 may be adapted to receive a drive belt, a drive pulley, and/or a disk brake rotor.

FIG. 4 is an exploded view of a portion of the wheel 10 of FIG. 1 depicting a step of the assembly method wherein the spinner 12 is rotatably mounted to the second support 14B via the tube 50 such the tube 50 passes through the central aperture 54 of the spinner 12 (see FIG. 2) and the end 50A of the tube 50 is received in the second support 14B. In FIG. 4 the tube 50 has been passed through the central openings of the ball bearings 56A and 56B mounted in the central aperture 54 of the spinner 12. The end 50A of the tube 50 is passed through the central aperture 78 of the second support 14B and into the mouth of the hole 84 in the side of the hub extension 70 of the second support 14B. In the embodiment of FIG. 4 a ball bearing 82 is mounted in a mouth of the hole 84 in a side of the hub extension 70 opposite the side connected to the central hub portion 74 of the second support 14B.

FIG. 5 is an exploded view of a portion of the wheel 10 of FIG. 1 depicting another step of the assembly method wherein the first support 14A is connected the side surface 20A of the rim 24 such that an end 50B of the tube 50, opposite the end 50A of FIG. 4, is received in the first support 14A. A hub extension 100 is connected to an outer surface 102 of a central hub portion 104 of the first support 14A. As described above, the first support 14A includes multiple spokes 32 extending from the central hub portion 104. In the embodiment of FIG. 5, the central hub portion 104 has five holes 106 surrounding a central aperture 108. Five bolts 110 are used to connect a side of the hub extension 100 to the outer surface 102 of the central hub portion 104 of the first support 14A.

Connected to the central hub portion 104 of the first support 14A, the hub extension 100 forms a part of the first support 14A. The hub extension 100 has a hole 112 passing therethrough. A mouth of the hole 112 in the side of the hub extension 100 connected to the central hub portion 104 of the first support 14A is dimensioned to receive the end 50B of the tube 50.

The end 50B of the tube 50 is passed through the central aperture 108 of the first support 14A and into the mouth of the hole 112 in the side of the hub extension 100. In the embodiment of FIG. 5 a ball bearing 114 is mounted in a mouth of the hole 112 in a side of the hub extension 100 opposite the side connected to the central hub portion 104 of the first support 14A.

As described above, each of the spokes 32 is adapted for connection to the side surface 20A of the rim 24. In the embodiment of FIG. 5, each of the spokes 32 has 4 holes 116 along an outer edge. As described in more detail below, four holes extend through the rim 24 between the side surface 20A and an opposite side surface for each of the spokes 32, and an internally threaded tube is inserted into each of the holes. To connect one of the spokes 32 to the side surface 20A of the rim 24, each of four bolts 118 is passed through a hole in the spoke 32 and threaded into a corresponding one of the internally threaded tubes. After the spokes 32 of the first support 14A are connected to the side surface 20A of the rim 24, the spinner 12 is rotatably mounted between the supports 14A and 14B.

Figure 6:
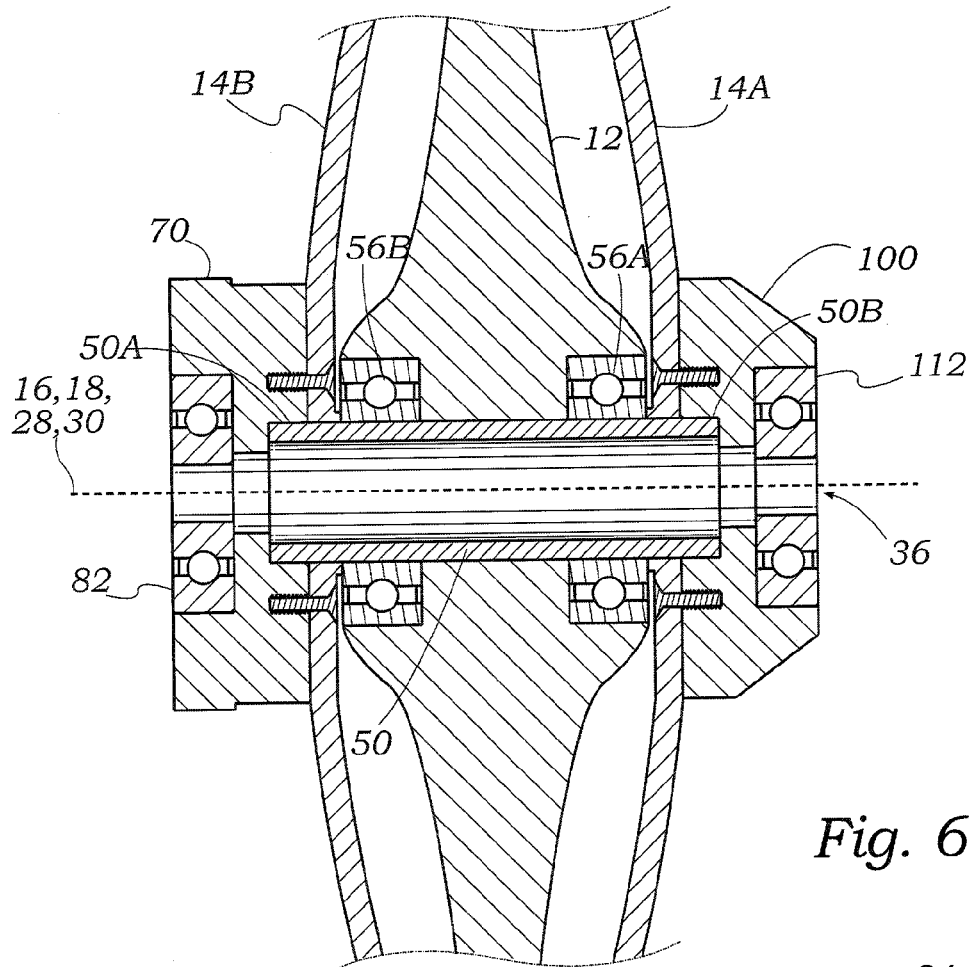
FIG. 6 is a sectional view of a central portion of the wheel of FIG. 1.

FIG. 6 is a sectional view of a central portion of the wheel 10 of FIG. 1, illustrating how the various components fit together in final assembly.

FIG. 7 is a sectional view of a portion of the wheel 10 as indicated by lines 7-7 in FIG. 1. FIG. 7 illustrates the above described mechanism used to connect the spokes 32 of the supports 14A and 14B to the respective side surfaces of the rim 24 of FIG. 1. In FIG. 7 the side surface 20A has a step 140 shaped to receive and frictionally engage an outer edge of a spoke 32 of the first support 14A, and the opposite side surface, labeled 20B, has a step 142 shaped to receive an outer edge of another spoke 32 of the second support 14B. A hole extends through the rim 24 between the side surfaces 20A and 20B, and an internally threaded tube 144 is positioned in the hole. To connect the spoke 32 of the first support 14A to the side surface 20A, a bolt 146 is passed through a corresponding hole in the spoke 32 and threaded into an end of the internally threaded tube 144. To connect the spoke 32 of the second support 14B to the side surface 20B, a bolt 148 is passed through a corresponding hole in the spoke 32 and threaded into an opposite end of the internally threaded tube 144. After being threaded into opposite ends of the internally threaded tube 144, the bolts 146 and 148 may be tightened simultaneously.

It is noted that an outer surface 150 of the spoke 32 of the first support 14A may contact a corresponding surface 152 of the side surface 20A, and an outer surface 154 of the spoke 32 of the second support 14B may contact a corresponding surface 156 of the side surface 20B, such that the tube 144 and the bolts 146 and 148 are not subjected to significant shear forces during use of the wheel 10. It is also noted that although bearings 82 (FIGS. 4 and 6) and 114 (FIGS. 5 and 6) are ball bearings in the embodiments shown and described, other types of bearings may also be used.

While FIG. 7 illustrates one method of attaching the supports 14A and 14B, those skilled in the art will recognize that alternative attachment mechanisms may also be used, and such alternatives should be considered within the scope of the claimed invention.

Figure 8:
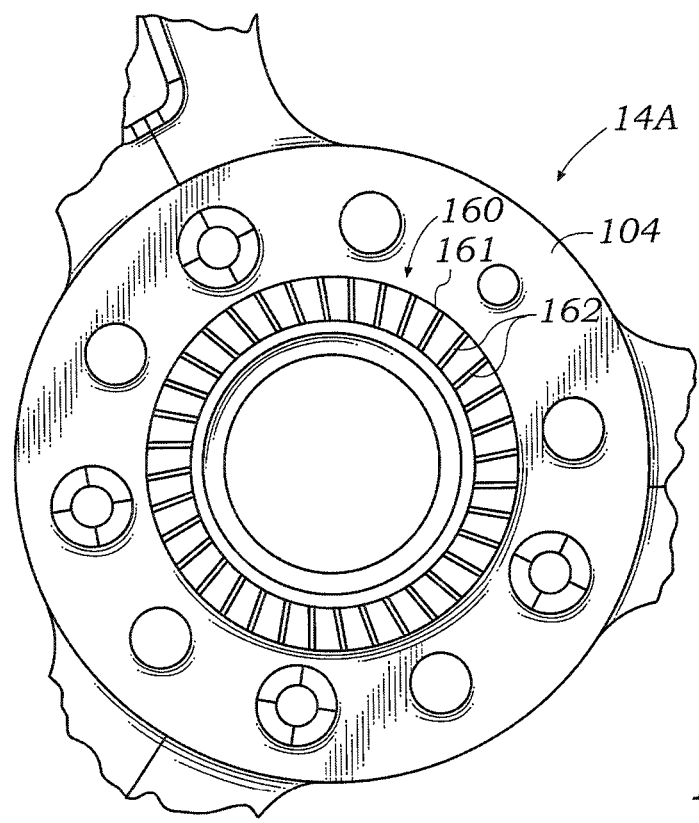
FIG. 8 is a front elevational view of an alternative embodiment of a central hub portion of one of the pair of supports, illustrating a water seal.
Figure 9:
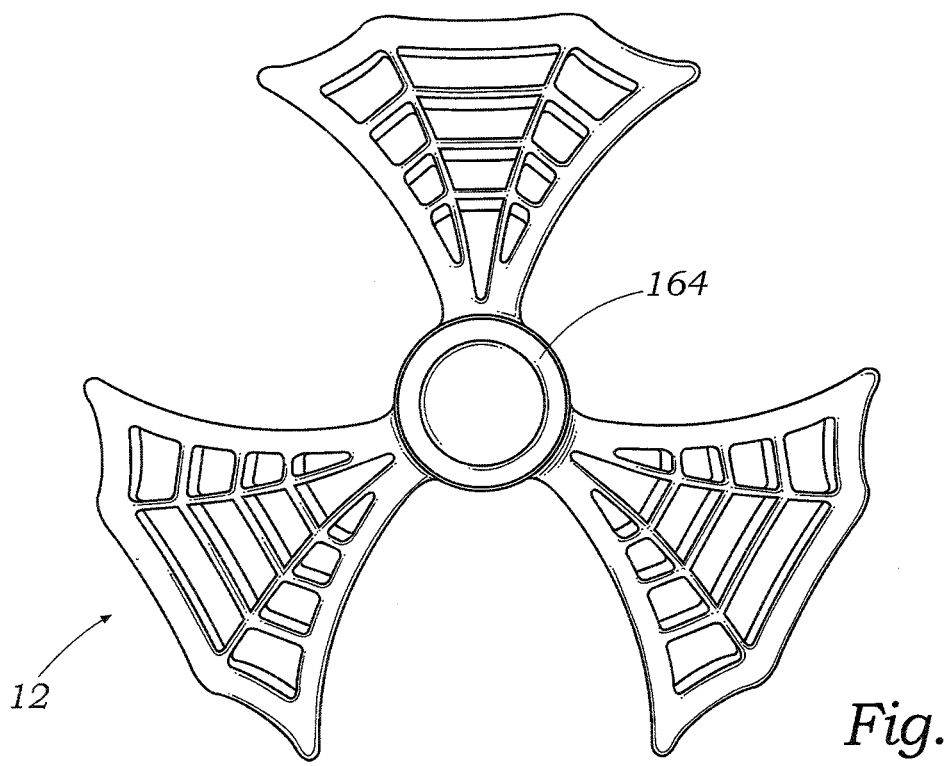
FIG. 9 is a side elevational view of an alternative embodiment of the spinner adapted for use with the water seal shown in FIG. 8.

FIG. 8 is a front elevational view of an alternative embodiment of a central hub portion 104 of one of the pair of supports 14A, illustrating a water seal 160. The water seal 160 may include a raised portion 161 that is raised about 60/1000 inch, and a plurality of angled slots 162 through the raised portion 161. The water seal 160 is adapted to integrate with a channel 164 of the spinner 12, as shown in FIG. 9. The raised portion 161 integrates with the channel 164 to exclude water and other contamination, and the angled slots 162 function to sling water away from the interior of the spinner 12.

Figure 10:
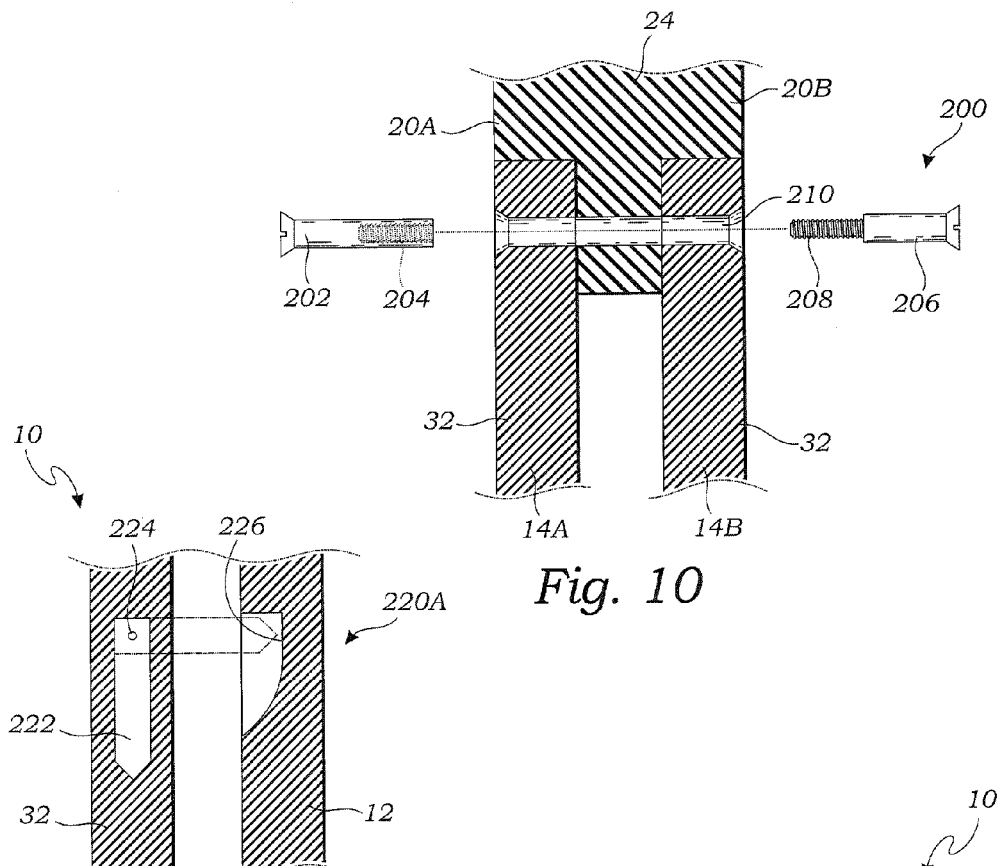
FIG. 10 is a sectional view similar to FIG. 7, illustrating an alternative embodiment of the mechanism used to connect the spokes of the supports to the respective side surfaces of the rim, wherein the mechanism includes a barrel bolt assembly.

FIG. 10 is a sectional view similar to FIG. 7, illustrating an alternative embodiment of the mechanism 200 used to connect the spokes 32 of the supports 14A and 14B to the respective side surfaces 20A and 20B of the rim 24. In this embodiment, the mechanism 200 is a barrel bolt assembly that includes a bolt 202 having an internally threaded portion 204, and a screw 206 having an externally threaded portion 208 adapted to threadedly engage the internally threaded portion 204. Similar barrel bolt assemblies are often referred to as "sex bolts." The barrel bolt assembly 200 is positioned through a hole 210 for locking the spokes 32 onto the rim 24.

Figure 11:
FIG. 11 is a sectional view of one embodiment of a spinner locking mechanism.
Figure 12:
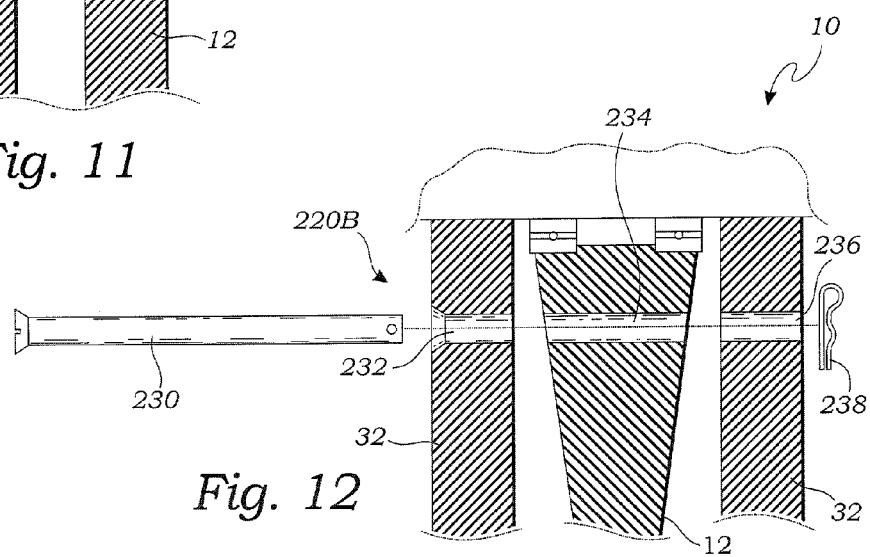
FIG. 12 is a sectional view of a second embodiment of the spinner locking mechanism.
Figure 13:
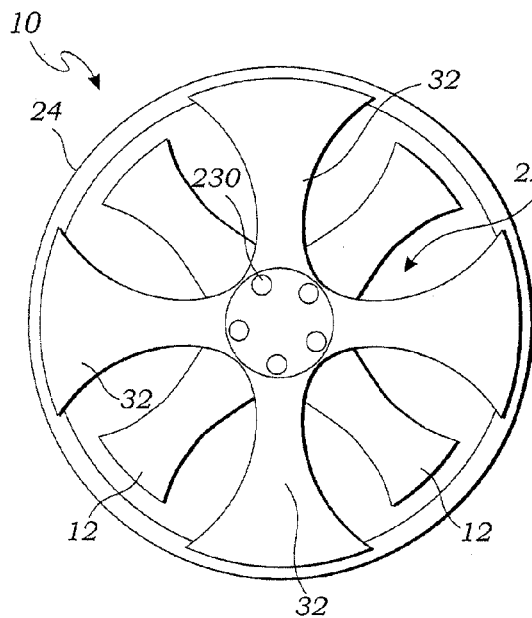
FIG. 13 is a side elevational view of the spinner locking mechanism being used to lock the center spinner in a first position, wherein the spinner is positioned between the side supports.
Figure 14:
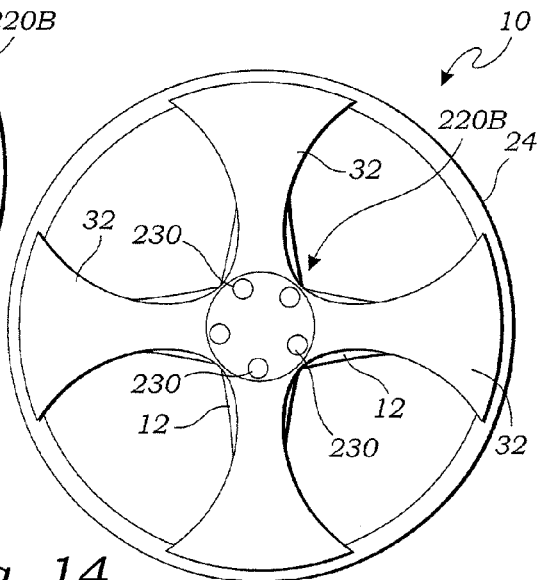
FIG. 14 is a side elevational view of the spinner locking mechanism being used to lock the center spinner in a second position, wherein the spinner is positioned behind the side supports.

In another embodiment, shown in FIGS. 11-14, the wheel 10 includes a spinner locking mechanism 220 for locking the spinner 12 with one or more of the spokes 32 for locking the spinner 12 in place and preventing rotation. A first embodiment of the spinner locking mechanism 220A is shown in FIG. 11, and a second embodiment of the spinner locking mechanism 220B is shown in FIGS. 12-14. Further embodiments are discussed in greater detail below.

FIG. 11 is a sectional view of a first embodiment of a spinner locking mechanism 220A. In this embodiment, the spinner locking mechanism 220A includes a locking arm 222 pivotally mounted on a pivot 224 of the spoke 32. The locking arm 222 pivots between a first orientation, wherein the locking arm 222 does not contact the spinner 12, and a second orientation, wherein the locking arm 222 engages a recess 226 in the spinner 12.

FIG. 12 is a sectional view of a second embodiment of the spinner locking mechanism 220B, wherein the spinner locking mechanism 220B includes a locking bolt 230 adapted to lock the spinner 12 with the spoke 32. In this embodiment, the locking bolt 230 is inserted through a first aperture 232 in one of the spokes 32, thorough a second aperture 234 in the spinner 12, and in this embodiment also through a third aperture 236 of the other of the spokes 32 (not included in other embodiments of the invention). A pin 238 or similar mechanism may be used to lock the locking bolt 230 in place.

As shown in FIGS. 13 and 14, the spinner locking mechanism 220B may include multiple locking bolts 230, preferably in opposing pairs; however, in alternative embodiments, the spinner locking mechanism 220 may include only one bolt 230. FIG. 13 illustrates the spinner locking mechanism 220B being used to lock the spinner 12 in a first position, wherein the spinner 12 is positioned between the spokes 32 so that they do not significantly overlap. FIG. 14 is a side elevational view of the spinner locking mechanism 220B being used to lock the spinner 12 in a second position, wherein the spinner 12 is positioned behind the spokes 32 so that they overlap. This enables the user of the wheel 10 to determine, to some extent, the shape and design of the wheel 10.

FIGS. 15-21 illustrate additional embodiments of the spinner locking mechanism. While these alternative embodiments of the spinner locking mechanism are illustrated herein, the invention is not limited to these particular embodiments, but further includes alternative locking mechanisms that are equivalent, or that might be devised by those skilled in the art given the teachings of the present invention.

Figure 15:
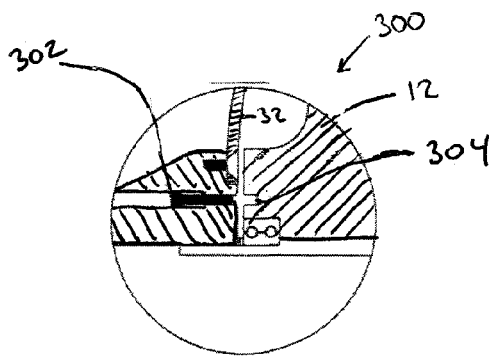
FIG. 15 is a sectional view of third embodiment of a spinner locking mechanism, illustrating a locking bolt in an unlocked position.
Figure 16:
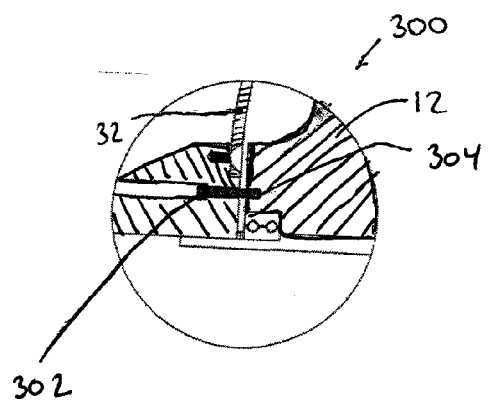
FIG. 16 is a sectional view of the third embodiment of the spinner locking mechanism, illustrating the locking bolt in a locked position extending into the spinner.

FIGS. 15-16 are a sectional views of a third embodiment of a spinner locking mechanism 300, wherein the locking mechanism 300 includes a locking bolt 302 that extends into a cavity 304 of the spinner 12 (or vice versa). FIG. 15 illustrates the locking bolt 302 in an unlocked position, and FIG. 16 illustrates the locking bolt in a locked position extending into the cavity 304 of the spinner 12. While one cavity 304 is illustrated, in one embodiment there are multiple cavities 304 positioned around the spinner 12 to enable the spinner 12 to be locked in a variety of positions relative to the first support 32 (and/or the second support).

Figure 17:
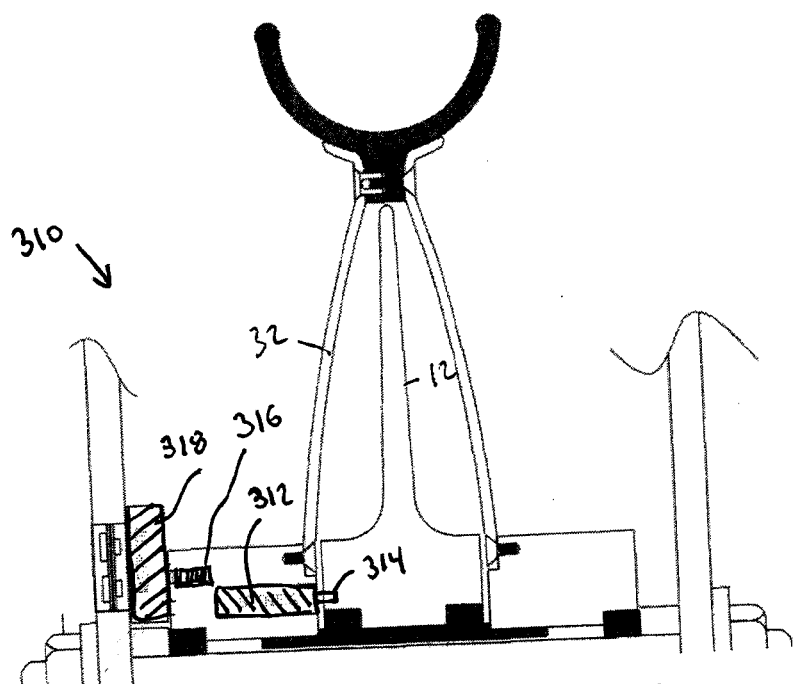
FIG. 17 is a sectional view of fourth embodiment of a spinner locking mechanism.
Figure 18:
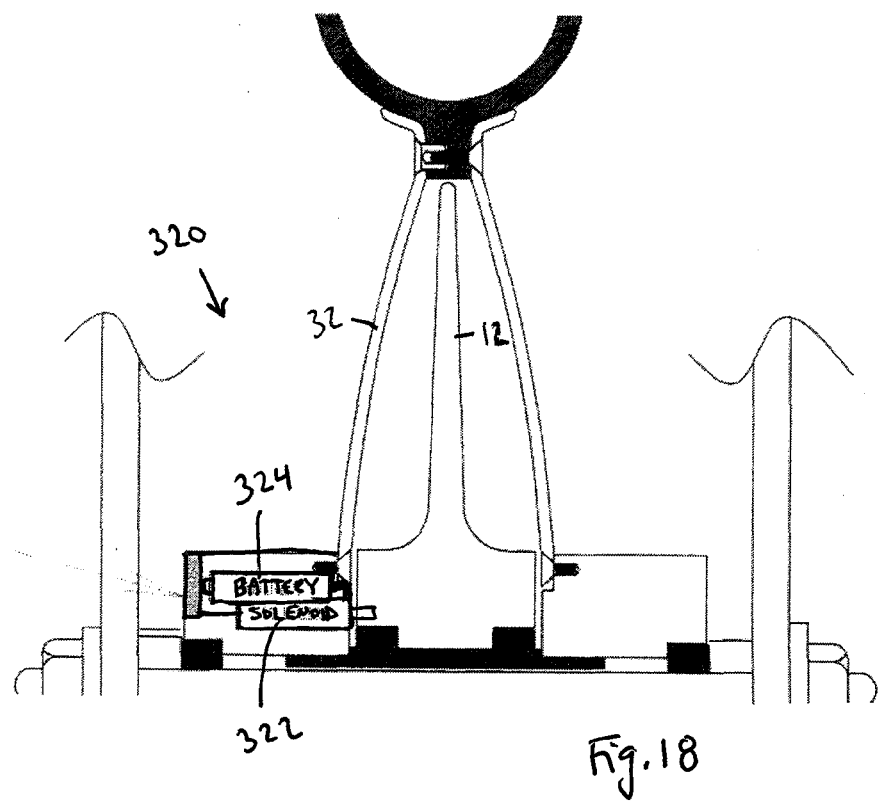
FIG. 18 is a sectional view of fifth embodiment of a spinner locking mechanism.
Figure 19:
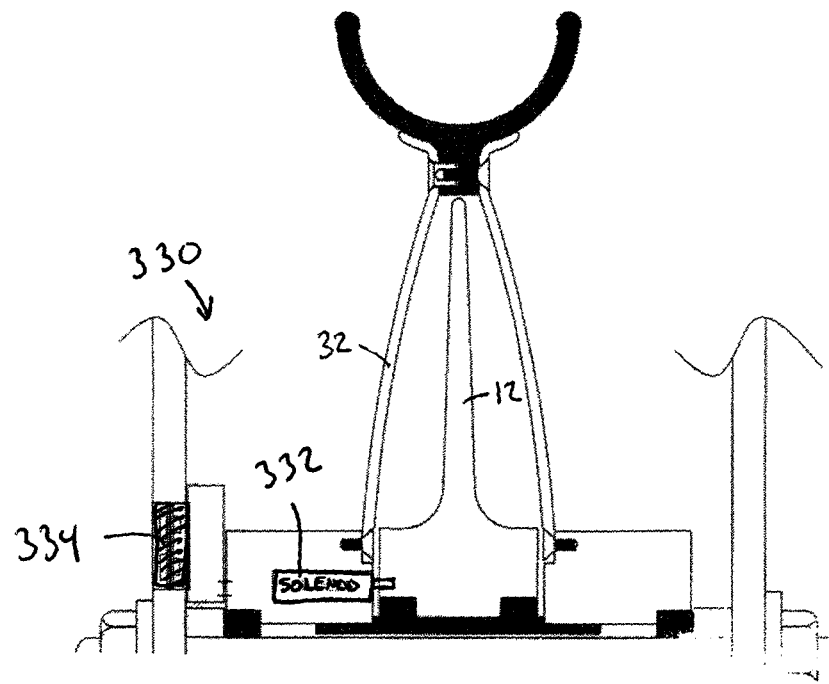
FIG. 19 is a sectional view of sixth embodiment of a spinner locking mechanism.

FIGS. 17-19 illustrate fourth, fifth, and sixth embodiments of the spinner locking mechanism, wherein a solenoid is utilized to electronically lock the spinner 12. In FIG. 17, spinner locking mechanism 310 includes a solenoid 312 that drives a locking feature 314 into the spinner 12. The solenoid 312 of this embodiments is powered by a electricity generator 318 (including magnet 316) electrically connected with the solenoid 312. In this manner, the user may operably control the spinner 12 via an electronic control (not shown), using either wired or wireless controls (not shown).

The locking mechanism 320 of FIG. 18 is similar to FIG. 17, only the solenoid 322 is powered by a battery 324. Similarly, the locking mechanism 330 of FIG. 18 is similar to FIG. 17, only the solenoid 332 is powered by a connection 334 with a power system of a vehicle, such as a battery of a motorcycle (not shown).

Figure 20:
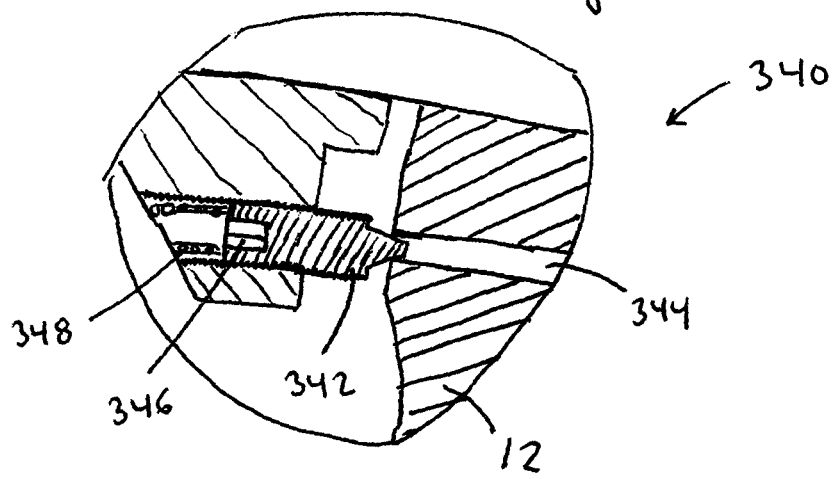
FIG. 20 is a sectional view of seventh embodiment of a spinner locking mechanism.

FIG. 20 is a sectional view of seventh embodiment of a spinner locking mechanism 340, including a screw element 342 that engages a conduit 344 of the spinner 12. The screw element 342 may include a contoured recess 346, such as for receiving an Allen wrench or similar tool. A spring 348 may be include to bias the screw element 342 and prevent the screw element 342 from being inadvertently removed.

Figure 21:
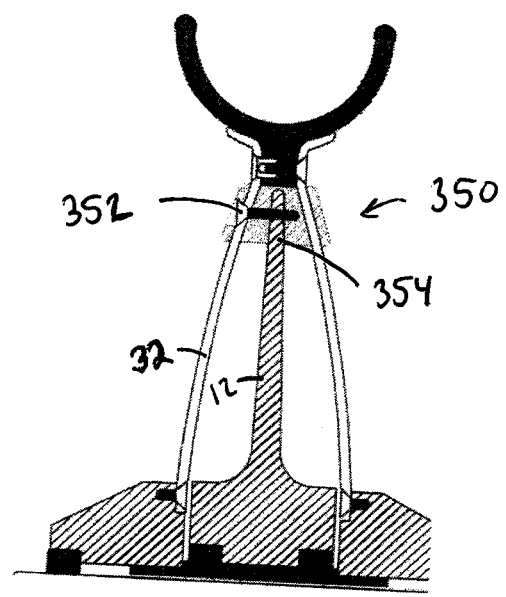
FIG. 21 is a sectional view of eighth embodiment of a spinner locking mechanism.

FIG. 21 is a sectional view of eighth embodiment of a spinner locking mechanism 350, including a screw 352 positioned through a distal end 354 of the spinner 12. The screw 352 may engage any part of the spinner 12, in any manner, to lock the position of the spinner relative to the spokes 32.

As discussed above, the invention is not limited to these embodiments, but also includes similar and/or equivalent mechanisms such as may be devised by one skilled in the art.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one embodiment, it is to be clearly understood by those skilled in the art that the invention is not limited thereto. Rather, the scope of the invention is to be interpreted only in conjunction with the appended claims.

What is claimed is:

1. A wheel, comprising:
a hub that includes a pair of hub extensions, each of the pair of hub extensions having a hole therethrough;
a rim;
first and second supports supporting the rim around the hub, each of the pair of hub extensions being mounted on one of the first and second supports;
a spinner rotatably mounted around the hub between the first and second supports, the spinner having an axis of rotation that is aligned with the holes of the pair of hub extensions; and
a spinner locking mechanism for selectively locking the spinner to prevent rotation of the spinner with respect to the first and second supports, or unlocking the spinner to allow rotation of the spinner relative to the first and second supports,
wherein the spinner locking mechanism includes a locking bolt that is operably mounted through one of the hub extensions, the first support, and/or the second support,
wherein the locking bolt is movable between an unlocked positioned in which the locking bolt does not engage the spinner, and a locked position in which the locking bolt engages one of a plurality of cavities in the spinner to lock the spinner so that it does not rotate relative to the first and second supports.

* * * * *